United States Patent
Nishizawa et al.

(10) Patent No.: US 6,422,468 B1
(45) Date of Patent: Jul. 23, 2002

(54) VISIBLE DISPLAY CARD AND PROCESSING SYSTEM

(75) Inventors: Yoshikazu Nishizawa; Masamitsu Ozawa; Masanari Nakamura, all of Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

(21) Appl. No.: 09/418,551

(22) Filed: Oct. 14, 1999

(30) Foreign Application Priority Data

Oct. 16, 1998 (JP) .......................... 10-295614

(51) Int. Cl.[7] .................... G06K 7/00; G06K 19/00
(52) U.S. Cl. ...................... 235/486; 235/487
(58) Field of Search ................ 235/486, 487, 235/488, 449, 451, 492, 493

(56) References Cited

U.S. PATENT DOCUMENTS

| | | | | |
|---|---|---|---|---|
| 5,332,890 A | * | 7/1994 | Kitahara | 235/440 |
| 5,471,044 A | * | 11/1995 | Hotta et al. | 235/487 |
| 5,514,856 A | * | 5/1996 | Kitahara et al. | 235/487 |
| 5,852,463 A | * | 12/1998 | Koshida et al. | 347/171 |
| 5,895,909 A | * | 4/1999 | Yoshida | 235/487 |
| 6,011,570 A | * | 1/2000 | Muranaka et al. | 347/171 |
| 6,013,345 A | * | 1/2000 | Koshida et al. | 428/78 |
| 6,174,836 B1 | * | 1/2001 | Hotta et al. | 503/201 |

FOREIGN PATENT DOCUMENTS

| | | | |
|---|---|---|---|
| EP | 0 749 093 A | 12/1996 | |
| GB | 2293574 A | 4/1996 | |
| JP | 03286879 A | * 12/1991 | 400/61 |
| JP | 5-33401 A | 12/1993 | |
| JP | 08030702 A | * 2/1996 | G06F/19/00 |

OTHER PUBLICATIONS

English Language Abstract for Japanese Patent 5–334501A dated Dec. 17, 1993.
"RICOH Thermo Chromic Film BA 520", Jan. 13, 1998, pp. 1–2.
"TC–Displays", Jun. 30, 1998, pp. 1–6.
RICOH Termo–Chromic Film, Technical Report, RICOH Co., Ltd., (1998) Month missing.

* cited by examiner

*Primary Examiner*—Karl D. Frech
*Assistant Examiner*—April A. Nowlin
(74) *Attorney, Agent, or Firm*—Scully, Scott, Murphy & Presser (57) ABSTRACT

A visible display card has a printing layer provided at least one side of the card, and an IC disposed by the side of the printing layer and having an external terminal. The printing layer forms printed images therein when heated, and the height of the printing layer is greater than that of the external terminal.

10 Claims, 7 Drawing Sheets

VISIBLE DISPLAY CARD AND PROCESSING SYSTEM

BACKGROUND OF THE INVENTION

The present invention relates to a visible display card including a printing layer in which images such as characters and patterns can be printed by heat treatment, and an IC which can perform input/output via external terminals. The invention also relates to a card processing system using the card.

Figure 9A:
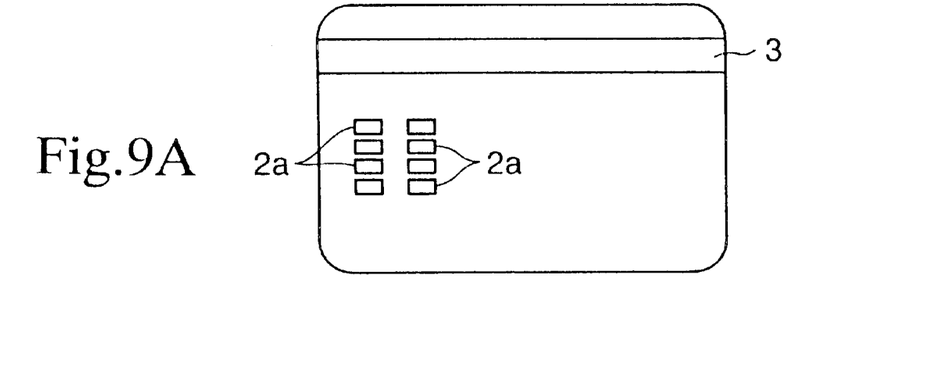
FIGS. 9A, 9B and 9C are plan views of the IC card.

In the past, cards such as cash cards having a magnetic strip have been widely used. In recent years, cards occasionally called IC cards which contain an IC or an embedded IC chip with a magnetic strip so as to increase the recorded data volume have been used. FIG. 9A shows an example of such a card, and numeral 2a refers to an external terminal of an IC contained in the card and numeral 3 refers to a magnetic strip.

Figure 9B:
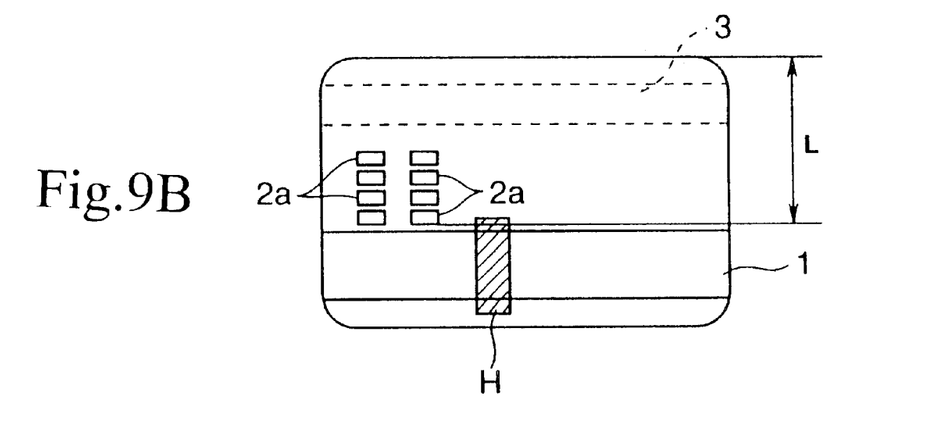

Recently, rewritable cards in which the previous image is erased and only the newest image is printed at the same position as the previous image are available. The rewritable card is manufactured of a resin substrate and a rewritable layer which is made of a heat-reversible recording material and is laminated on the substrate. A thermal head unit of a card processing unit performs heating/cooling processes on the rewritable layer according to the characteristics thereof so as to repeatedly perform erasing/printing, in other words, rewriting images. The inventors have been performing research on cards which have the functions of such a rewritable card with the above-mentioned IC card. FIG. 9B shows an example of such a card, in which external terminals 2a of an IC and a rewritable layer 1 are provided at the surface of the card, and a magnetic strip 3 is provided on the reverse surface thereof.

Positions and heights of external terminals of ICs are regulated according to "Japanese Industrial Standard No. 6303". As shown in FIG. 9B, the distance L between the edge of the card and the farthest external terminal 2a from the edge is 28.55 mm or more. The height of the external terminal 2a is regulated to within±0.1 mm from the surface of the card. Typically, the height is determined so as to project the external terminal 2a within 0.1 mm from the surface of the card in order to ensure contact between the external terminals and the terminals of the IC unit.

In the meantime, there is a strong demand to expand the printing area by enlarging the width of the rewritable layer 1. If the width of the rewritable layer 1 is enlarged, the rewritable layer 1 adjoins the end external terminal 2a. However, the length of the erasing head H is set to be longer than the width of the rewritable layer 1 in order to ensure proper erasing, and the erasing head H may be arranged so as to overlap the end thereof with the external terminal 2a. As a result, erasing head H contacts the external terminal 2a, and external terminal 2a and the internal circuit of the card may be damaged by heat, and the erasing of the image is not properly performed due to poor contact between the erasing head H and the rewritable layer 1. This problem is not limited to rewritable cards, but is generally found in all IC cards on which thermal printing is performed.

SUMMARY OF THE INVENTION

The present invention has been completed in view of the above circumstances. An object of the invention is to provide a visible display card and a card processing system in which the thermal head does not contact the external terminal, whereby the printing layer can be as wide as possible.

The present invention provides a visible display comprising a printing layer provided on at least one side of the card, and an IC disposed by the side of the printing layer and having an external terminal. The printing layer is printable thereon by being heated, and the height of the printing layer from the surface of the card is greater than that of the external terminal.

According to the visible display card, even if the end of the thermal head is disposed to overlap the external terminal, the thermal head contacts the printing layer without contacting the external terminal, since the height of the printing layer above the surface of the card is greater than that of the external terminal. More specifically, the card is rectangular in plan view, and the printing layer extends along the longitudinal direction of the card as a strip. The thermal head contacts the printing layer and relatively moves toward longitudinal direction thereof. During the procedure, the end of the thermal head passes over the external terminal. Thus, the visible display card of the invention enables enlargement of the width of the printing layer so as to be wide as possible, preventing contact between the thermal head and the external terminal.

The IC may be contained in the card, and the external terminal is exposed at the surface of the card. Alternatively, the card has the IC embedded therein, and the external terminal is exposed at the surface of the IC. A magnetic strip may be provided on at least one side the card. Moreover, the printing layer may adjoin the IC in the longitudinal direction of the card. Alternatively, the printing layer may adjoin the IC in the longitudinal direction of the card and the direction perpendicular to the longitudinal direction.

The present invention also provides a card processing system using the above visible display card and a card processing unit. The card processing unit comprises a thermal head which is movable so as to contact and separate from the printing layer of the card traveled in the unit, and forms images on the printing layer by contacting and heating the printing layer, and an IC unit having a terminal for contacting the external terminal of the IC. A card processing system so constructed allows the width of the printing layer to be enlarged so as to be as wide as possible, preventing contact of the thermal head and the external terminal.

The thermal head may be arranged so that the end thereof overlaps the external terminal of the IC in plan view. The thermal head may comprise a head for printing images on the printing layer and a head for erasing images printed on the printing layer.

DETAILED DESCRIPTION OF THE INVENTION

Figure 1:
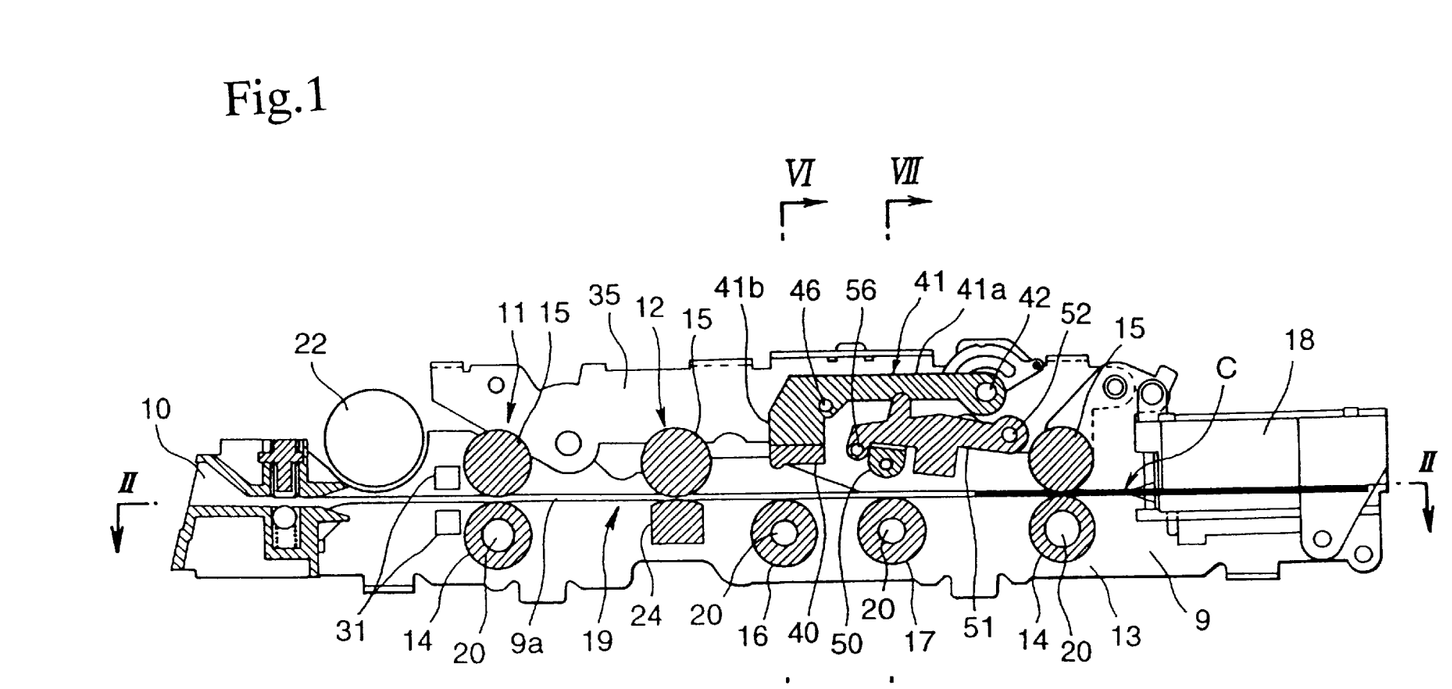
FIG. 1 is a right side sectional view of the card processing unit according to an embodiment of the invention.
Figure 2:
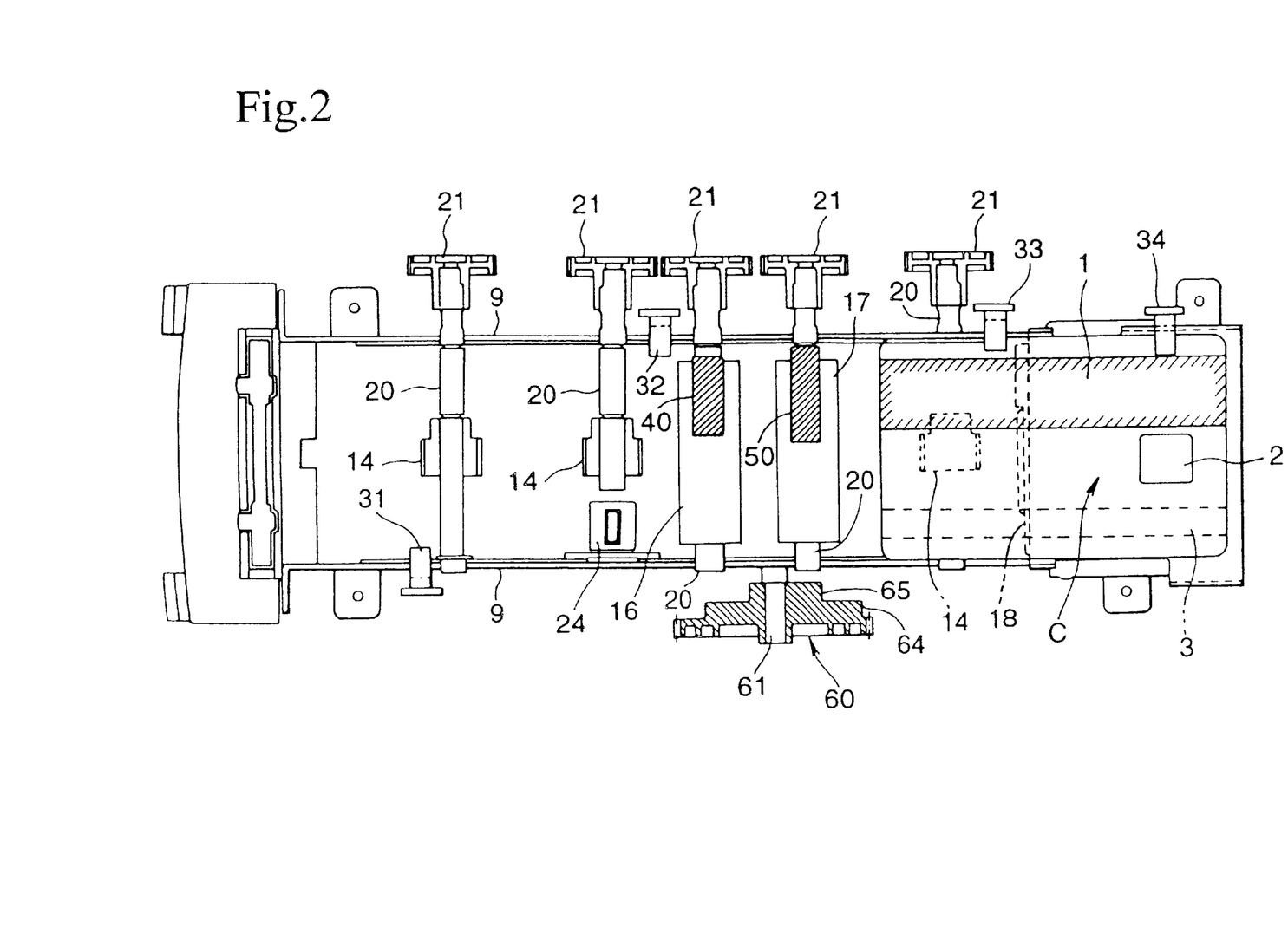
FIG. 2 is a view taken along line II—II of FIG. 1.

An embodiment of the invention will be explained with reference to the drawings. FIG. 1 is a right sectional view of a card processing unit used by a card processing system of the embodiment, and FIG. 2 is a view taken along line II—II of FIG. 1 The left side in the figures is the front side of the unit, the right side in the figures is the rear side of the unit, the upper side in FIG. 2 is the left side of the unit, and the lower side in FIG. 2 is the right side of the unit. In the following descriptions, the front, back, left, and right directions are directions based on such a card processing unit. As shown in FIG. 1, when a rewritable card C (a visible display card, hereinafter referred to simply as a "card") is inserted into an insertion opening 10 provided at the front end of the card processing unit, and the card C is traveled to the standby position at the rear end of the unit. When a predetermined processing command is issued under these conditions, the card C is traveled to the front, and erasing and printing are performed in that order, on a rewritable layer disposed at the surface of the card C. First, details of the card C will be explained before explanation of the construction of the card processing unit.

(1) Construction of Rewritable Card

The card C is a rectangular IC card, for example, according to "Japanese Industrial Standard No. 6303". As shown in FIG. 2, the card C comprises a substrate made of a resin such as PVC (polyvinyl chloride). A rewritable layer 1 (printing layer), made of a heat-reversible recording material, is laminated on the substrate. An IC chip is provided on the surface of the substrate. A magnetic strip 3 is provided on the reverse surface of the substrate. Rewritable layer 1 is laminated in a strip at the upper side of the card C over the entire length of the card C in FIG. 2. The IC chip 2 is embedded below the rewritable layer 1 and at a certain position at the right side of the card C. The surface of IC chip 2 is located at a position lower than the surface of the card C. External terminals (not shown) of the IC chip 2 are arranged as shown in FIG. 9B, and the surfaces thereof coincide with the surface of the IC chip 2. The magnetic strip 3 on the reverse surface is laminated at the under side of the card C.

Figure 3:
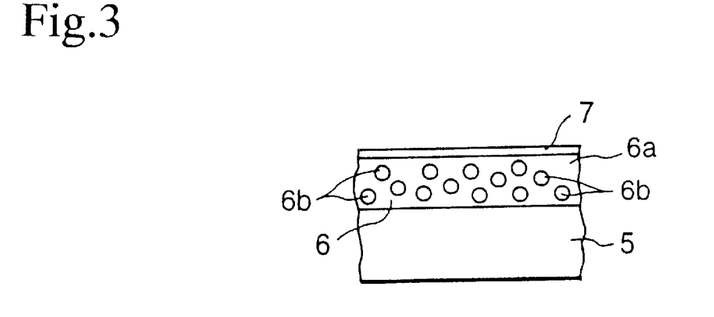
FIG. 3 is a schematic view showing a heat-reversible recording material which forms a printing layer of a rewritable card according to an embodiment of the invention.
Figure 4:
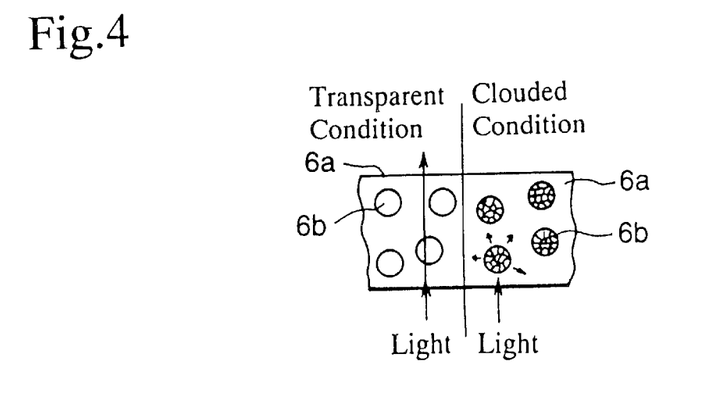
FIG. 4 shows the function of the heat-reversible recording material.

The heat-reversible recording material forming rewritable layer 1 is reversible by heating, and the recording material is capable of being repeatedly erased/printed on, in other words, being rewritten on. As shown in FIG. 3, the heat-reversible recording material is manufactured so that a recording layer 6 in which an organic low-molecular substance 6b is dispersed in a resin 6a, and a protective layer 7, are laminated on a transparent polyester film 5 in that order. A higher fatty acid having a particle size of 1 $\mu$m or less is used for the organic low-molecular substance 6b. The function of the heat-reversibility is explained with reference to FIG. 4. In the transparent condition, the particles in the organic low-molecular substance 6b in the recording layer 6 form relatively large single crystals. Therefore, there are a few frequencies at which incident light passes through the crystal interface, so that incident light is transmitted without scattering, and hence the recording layer 6 appears to be transparent overall. In the clouded condition, the particles in organic low-molecular substance 6b form polycrystals. Therefore, incident light is refracted many times at the crystal interface, so that the light is scattered, and the recording layer 6 can be seen as white.

Figure 5:
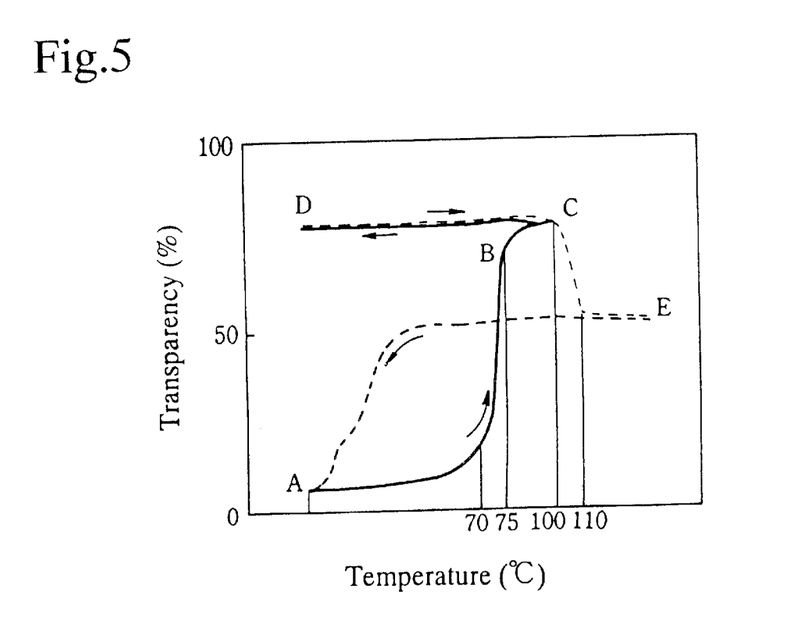
FIG. 5 is a chart showing transparent/clouded change according to heating of the heat-reversible recording material.

Heat-reversible characteristics of the heat-reversible recording material are explained with reference to FIG. 5. At first, the heat-reversible recording material is in the clouded condition (A) at room temperature (20 to 30° C.). When the recording material is heated, the transmissivity begins to increase from about 70° C., as shown by the continuous line, and it becomes most transparent condition (B to C) at about 75 to 100° C. The transparent condition is maintained, even if the recording material is cooled to room temperature (D). Then, as shown by the broken line, the material in the most transparent condition is heated again to 110° C. or more, thereby changing to in an intermediate condition between the most transparent condition and the most clouded condition (D to C to E). When the material is cooled to room temperature, it returns to the original clouded condition (E to A).

(2) Construction of Card Processing Unit

The construction of the card processing unit will be explained hereinafter. Numeral 9 in FIG. 1 and FIG. 2 indicates a pair of right and left lower side frames facing parallel to each other in a spaced condition. As shown in the figures, a pair of first travel rollers 11, a pair of second travel rollers 12 and a pair of third travel rollers 13 are disposed, in that order, from the front along the center of the lower side frames 9 and 9. Each pair of travel rollers 11, 12 and 13 consists of a lower driving roller 14 and an upper following roller 15 so as to clamp the card C and travel it from the front to the rear or from the rear to the front according to the rotation of the driving roller 14. A printing platen roller 16 and an erasing platen roller 17 are disposed, in that order, between the second pair of travel rollers 12 and the third pair of travel rollers 13. A printing head 40 is disposed above the printing platen roller 16. An erasing head 50 is disposed above the erasing platen roller 17.

As shown in FIG. 1, an IC unit 18 is disposed at the rear end between the lower side frames 9 and 9. The IC unit 18 contacts the external terminals of the IC chip 2 of the card C so as to perform input/output with respect to the IC chip 2. A travel path 19 is formed between an insertion opening 10 for the card C and the IC unit 18. The carrying path 19 horizontally connects the clearances of the upper and lower rollers 14 and 15 of the first through third pair of rollers 11, 12 and 13, the clearance of the printing platen roller 16 and the printing head 40, and the clearance of the erasing platen roller 17 and the erasing head 50. A groove-shaped card guide 9a is provided at the inner surface of the lower side frame 9 so as to smoothly travel the card C along the travel path 19. As mentioned above, the card C is first traveled to the standby position at the rear end of the unit when the card C is inserted into the insertion opening 10. The standby position is the inside of the IC unit 18. Numerals 31, 32 and 33 refer to sensors for detecting the card C in FIG. 1 and FIG. 2.

As shown in FIGS. 1 and 2, each driving roller 14 of the first through the third pairs of rollers 11, 12 and 13 and each platen roller 16 and 17 synchronously rotates with driving shafts 20 rotatably supported by the lower side frames 9 and 9. Each driving shaft 20 penetrates the left lower side frame 9, and the projected end thereof from the lower side frame 9 is attached to a driving gear 21. The driving gears 21 are connected to a main motor 22 shown in FIG. 1 by intermediate gears (not shown). When, the main motor 22 rotates, the rotation force thereof is transmitted to the driving gear 21 via intermediate gears so as to rotate the driving shaft 20 to the coincident direction, whereby the driving rollers 14 of the first through the third pairs of rollers 11, 12 and 13 and the platen rollers 16 and 17 rotate. The card C is traveled along the travel path 19 according to the direction of rotation of the driving rollers 14 and the platen rollers 16 and 17. As shown in FIG. 2, a magnetic head 24 for performing reading/writing of data on the magnetic strip 3 of the card C is disposed at the right side of the driving roller 14 of the second pair of rollers 12.

As shown in FIG. 1, a pair of right and left upper side frames 35 and 35 is attached to the lower side frames 9 and 9. The rear ends of the upper side frames 35 are hinged to the lower side frames 9. Therefore, the upper side frames 35 swing up and down so as to open and close coincidentally. Arms 41 and 51 extending toward the front are hinged to the upper side frames 35 and 35 so as to swing. The printing head (thermal head) 40 is attached to the arm 41, and the erasing head (thermal head) 50 is attached to the arm 51. As shown in FIG. 2, the width of the printing head 40 approximately coincides with the width of the rewritable layer 1. The width of the erasing head 50 is wider than that of the rewritable layer 1.

Figure 6:
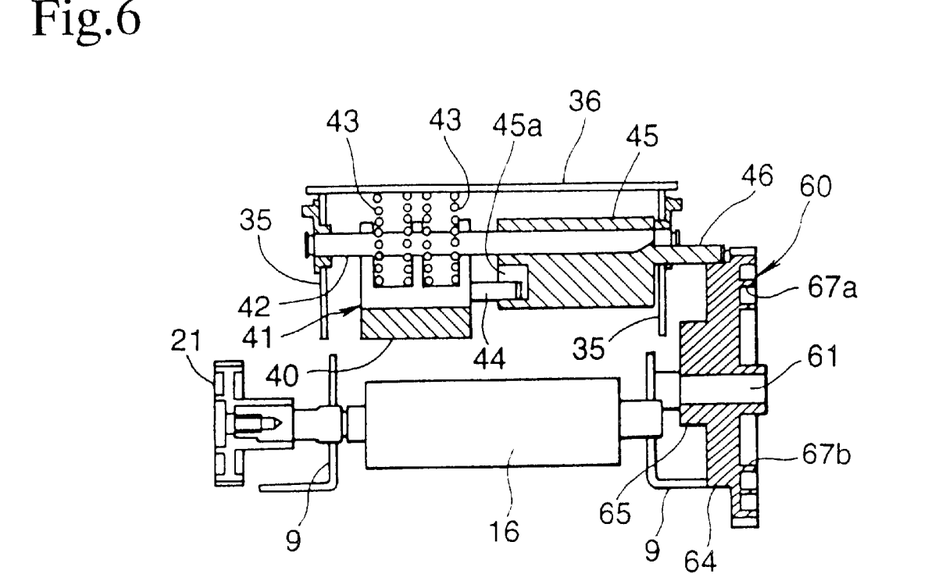
FIG. 6 is a view taken along line VI—VI of FIG. 1.

The arm 41 of the printing head 40 has an L-shaped configuration in side view, in which a long portion 41a extends toward the front and a short portion 41b extends downward from the front end of the long portion 41a. The rear end of the long portion 41a is supported at the left side of a swing shaft 42 which is supported by the upper side frame 35 and 35. The printing head 40 is attached to the lower surface of the short portion 41b which is a swinging end. As shown in FIG. 6, a top panel 36 is disposed above the printing head 40 and the erasing head 50. The top panel 36 is secured to the upper side frames 35 and 35. A pair of right and left compression springs 43 is disposed between the top panel 36 and Ad the swinging end of the arm 41. The printing head 40 is usually biased downward by the compression springs 43 via the arm 41. As shown in FIG. 1 and FIG. 6, in the vicinity of the inner corner defined by the long portion 41a and the short portion 41b, a pin 44 projects from the right side surface of the arm 41. A sub-arm 45 forwardly extending parallel to the arm 41 is disposed at the right side of the arm 41. The sub-arm 45 is supported by the swing shaft 42 so as to swing around the shaft 42 as well as the arm 41. A recess 45a is formed at the arm 41 side of the front end of the sub-arm 45. The pin 44 engages with the recess 45a, so that the sub-arm 45 swings approximately coincidently with the arm 41. A cam pin 46 coaxial with the pin 44 projects from the right side surface of the front end of the sub-arm 45.

Figure 7:
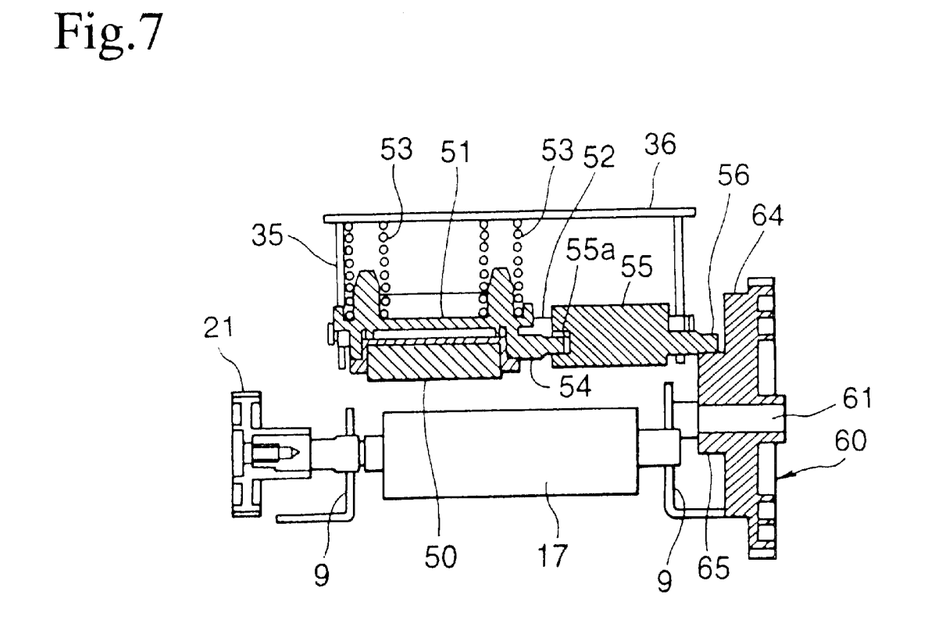
FIG. 7 is a view taken along line VII—VII of FIG. 1.

As shown in FIG. 1, the arm 51 for the erasing head 50 is disposed below the arm 41 for the printing head 40. A swing shaft 52 is supported by the side frames 35 and 35, and the rear end of the arm 51 is supported by the left end of the shaft 52, whereby the arm 51 swings around the shaft 52. The shaft 52 is located below the shaft 42 for the printing head 52 and in slightly rearward thereof. The arm 51 extends in the vicinity of the inner corner of the arm 41 for the printing head 40. The erasing head 50 is mounted on the lower surface of the front end of the arm 51. As shown in FIG. 7, a pair of right and left compression springs 53 is disposed between the top panel 36 and the swinging end of the arm 51. The erasing head 50 is usually biased downward by the compression springs 53 via the arm 41 as well as the printing head 40. A pin 54 projects in front of the erasing head 50 from the right side surface of the arm 51. A sub-arm 55 forwardly extends approximately parallel to the arm 51 in the right side of the arm 51. The rear end of the sub-arm 55 is supported by the swing shaft 52 so as to swing around the shaft 52 as well as the arm 51. A-recess 55a is formed at the arm 51 side of the front end of the sub-arm 55. The pin 54 engages with the recess 55a, so that the sub-arm 55 swings approximately coincidently with the arm 51. A cam pin 56 coaxial with the pin 54 projects from the right side surface of the front end of the sub-arm 55.

As shown in FIG. 6 and FIG. 7, a cam gear 60 is disposed at the outer side (the lower side in FIG. 2) of the right lower side frame 9. The cam gear 60 swings the printing head 40 and the erasing head 50 so as to contact and separate from the traveled C. The cam gear 60 is rotatably supported by the right lower side frame 9 via a shaft 61, and rotates by a cam motor (not shown) in the counterclockwise direction when viewed from the right side. A cam 64 for swinging the printing head 40 and a cam 65 for swinging the erasing head 50 are coaxially formed on the cam gear 60 in predetermined profiles. As shown in FIG. 6, the cam pin 46 for the sub-arm 45, which is biased downward coincidently with the printing head 40, usually contacts the upper surface of the cam 64 for the printing head 40 in a sliding connection. As shown in FIG. 7, the cam pin 56 for the sub-arm 55, which is biased downward coincidently with the erasing head 50, usually contacts the upper surface of the cam 65 for the erasing head 50 in a sliding connection.

(3) Function of the Card Processing System

The function of the above card processing system will be explained hereinafter. When the card C is inserted into the insertion opening 10, the sensor 31 detects it, and the main motor 22 rotates to rotate the first through third pairs of travel rollers 11, 12 and 13. Thus, the card C is traveled to the standby position of the rear end, where the terminals of the IC unit 18 contact the external terminals of the IC chip 2 to conduct data input/output. When the predetermined command is issued, preheating for the printing head 40 and the erasing head 50 starts, and he first through third pairs of traveled rollers 11, 12 and 13 rotate in reverse to traveled the card C to the insertion opening 10.

Figure 8:
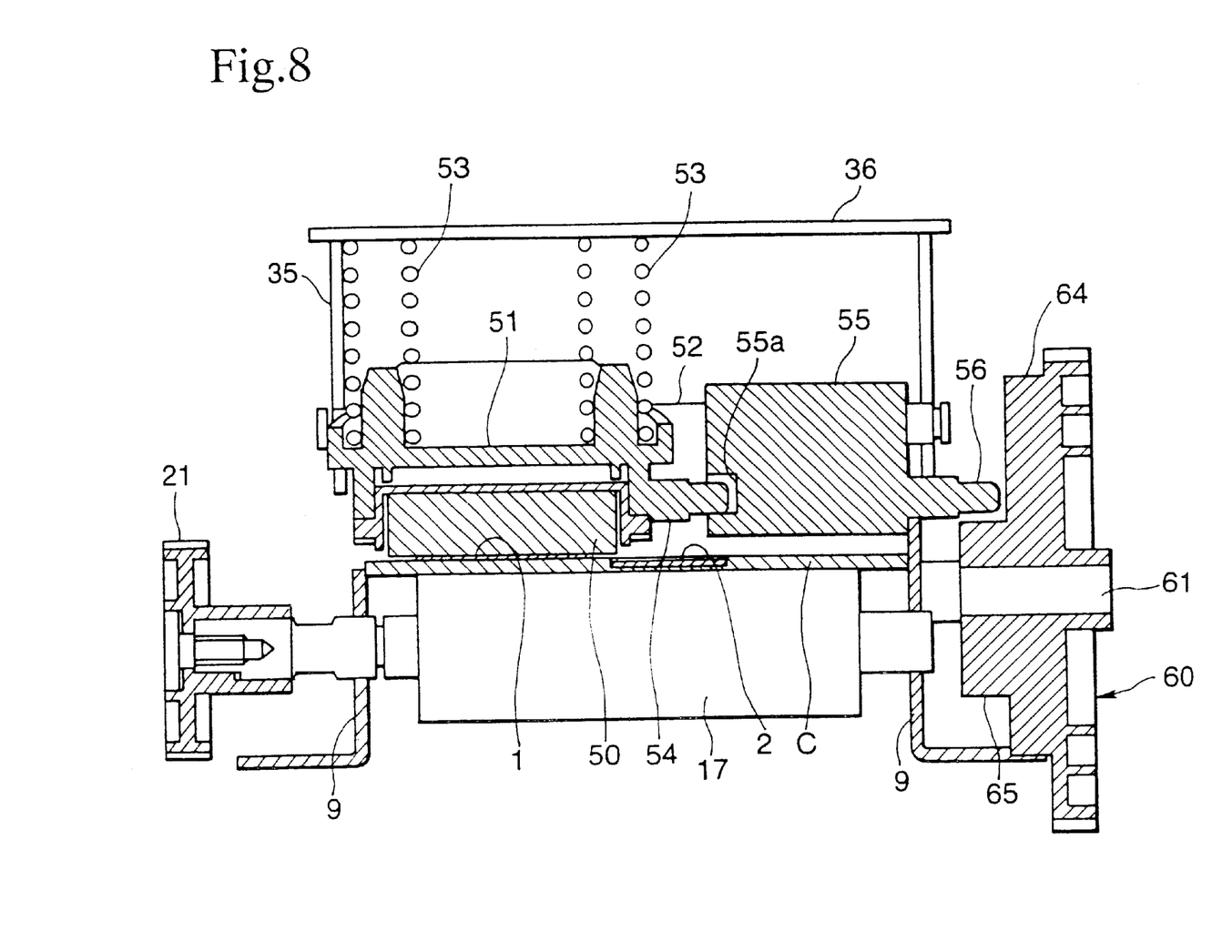
FIG. 8 is an enlarged view taken at arrow X of FIG. 7.

When the front edge of the card C just about to reach a position below the erasing head 50, the cam gear 60 rotates. Due to the biasing force of the compression springs 53, the sub-arm 55 and the arm 51 swing downward along the profile of the cam 65 for the erasing head 50. Then, as shown in FIG. 8, the erasing head 50 is thrust to the card C due to the biasing force of the compression springs 53. The erasing head 50 has a length to overlap with the IC chip 2 (and the external terminal thereof). In spite of this, the erasing head 50 contacts only the rewritable layer 1 and has a clearance with the IC chip 2 since the surface of the IC chip 2 is lower than the surface of the rewritable layer 1. Therefore, the heat of the erasing head 50 acts only on the rewritable layer 1, so that erasing of the image is performed without any problems and the IC chip 2 is not damaged. Therefore, the rewritable layer 1 can be as wide as possible.

Next, when the front edge of the card C is just about to reach a position below the printing head 40, due to the biasing force of the compression springs 43, the sub-arm 45 and the arm 41 swing downward along the profile of the cam 64 for the printing head 40. Then, the printing head 40 is thrust to the card C due to the biasing force of the compression springs 43, and performs thermal printing on the rewritable layer 1. Then, the card C passes through the printing head 40, and is discharged to the. insertion opening 10.

Figure 9C:
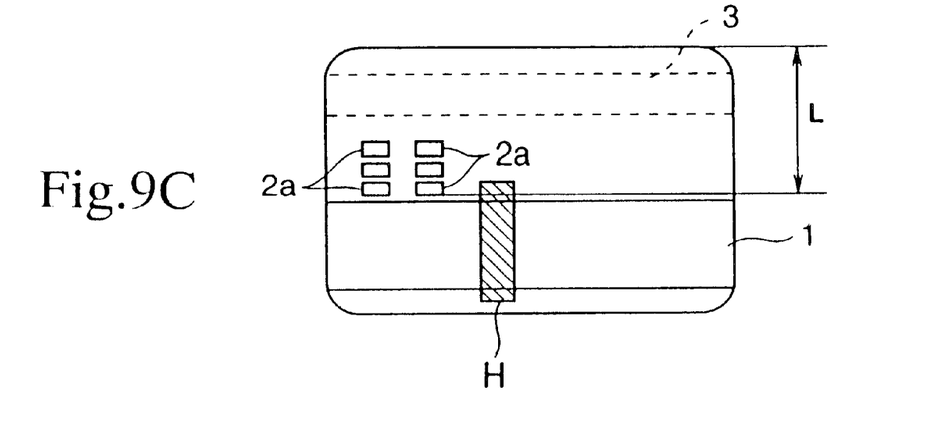

It should be noted that the same advantages as those of the above embodiment can be obtained in the case in which width of the printing head 40 is greater than the width of the rewritable layer 1 and the end of the printing head 40 overlaps with the IC chip 2. The invention can be applied to a card C in which an IC is contained in the card C and only external terminals are exposed at the surface of the card C. The surface of the IC chip 2 is lower than that of the card C in the above embodiment. Alternatively, the IC chip 2 can project from the surface of the card C so that the surface of the IC chip 2 is lower than that of the rewritable layer 1. The embodiment illustrates the case in which eight external terminals 2a are employed as shown in FIG. 9B. As shown in FIG. 9C, six external terminals 2a are employed to widen the rewritable layer 1.

Figure 10A:
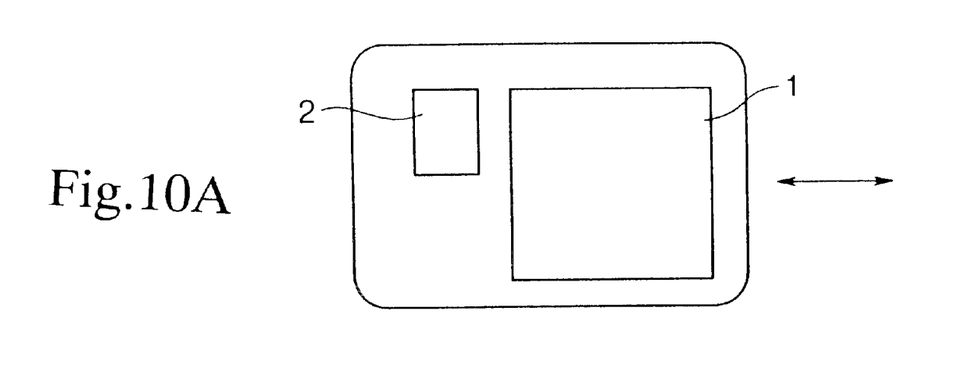
FIGS. 10A, 10B and 10C are plan views of another embodiment of the IC card.
Figure 10B:
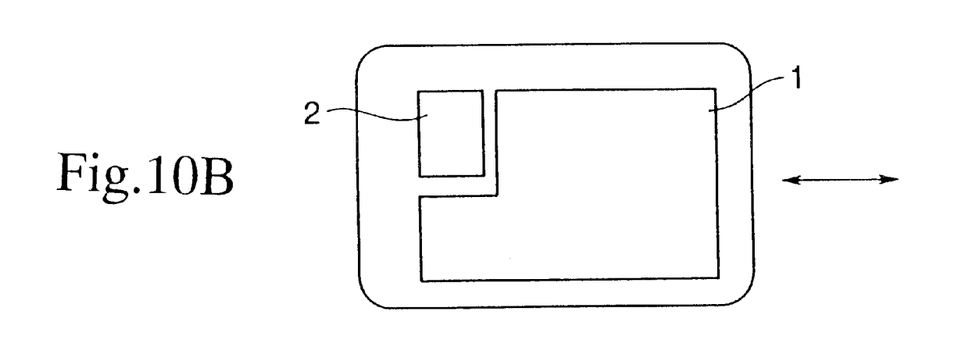

The embodiment is applied to the rewritable card, but the invention can be applied to all kinds of IC cards having visible display portions. Arrangement of the IC chip and the external terminals is not limited to the above embodiment, but other arrangements may be employed. For example, FIG. 10A shows a variation in which a printing layer 1 is provided on a large portion adjoining the IC chip 2 in the traveling direction (shown by the arrow in the figure) of the IC chip 2. FIG. 10B shows a further variation in which the side of the printing layer 1 is partly extended to the side of the IC chip 2. The problem in which the thermal head contacts the IC chip would arise whenever the printing layer 1 is disposed anywhere around the IC chip (or external terminal of the IC chip), and therefore the function of the invention is exhibited. The printing region, which may have such a problem, will be explained hereinafter comparing the invention and the conventional art.

Figure 10C:
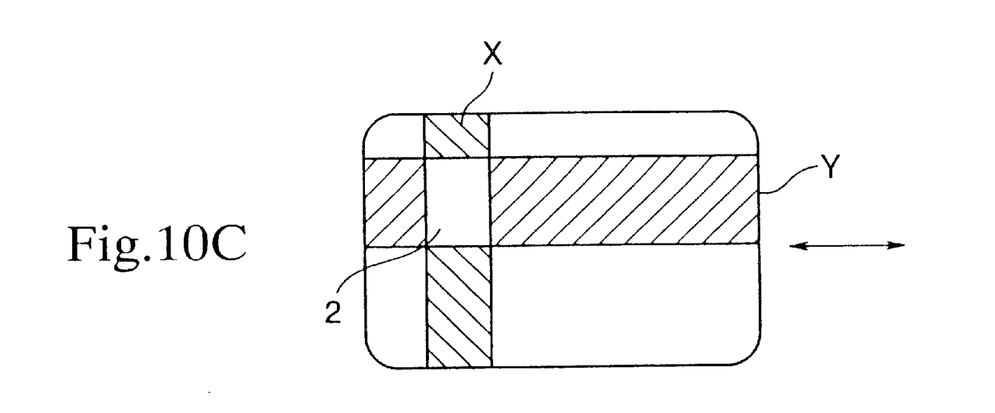

The portion which is indicated by the shading in FIG. 10C shows the printing layer region in which contact problems may occur between the thermal head and the IC chip 2. In the conventional art, the surface of the IC chip 2 projects from the printing layer or coincides with it. Therefore, in order to print on the region X, the thermal head must not overlap the IC chip 2. Due to this, the width of the thermal head is restricted, and it is difficult to print on the portion in the vicinity of the IC chip 2. In printing on the region Y, the width of the thermal head is not restricted, and printing over the entire width of the printing layer is possible. For this procedure however, the thermal head must be retracted when the thermal head passes over the IC chip 2 to avoid contact therewith.

In the invention, even if the thermal head is arranged to overlap with the IC chip 2, they do not contact since the IC chip 2 is lower than the printing layer. Therefore, the width of the thermal head is not restricted for printing on the entire width of the printing layer of the region X and the region Y.

As mentioned above, the invention is characterized in that the height of the printing layer above the surface of the card is greater than that of the external terminal. Therefore, the printing layer can be as wide as possible and contact of the thermal head and the external terminal of the IC can be prevented, even if the end of the thermal head overlaps with the external terminal.

What is claimed is:

1. A visible display card comprising:
   a printing layer provided on at least one side of the card, the printing layer being printable thereon by being heated; and
   an IC disposed by the side of the printing layer and having an external terminal;
   wherein a height of the printing layer from a surface of the card is greater than that of the external terminal.

2. The visible display card according to claim 1, wherein the card is rectangular in plan view, and the printing layer extends along a longitudinal direction of the card as a strip.

3. The visible display card according to claim 1, wherein the IC is contained in the card, and the external terminal is exposed at the surface of the IC.

4. The visible display card according to claim 1, wherein the IC is embedded in the card, and the external terminal is exposed at the surface of the IC.

5. The visible card according to claim 1, wherein the card has a magnetic strip provided on at least one side of the card.

6. The visible display card according to claim 1, wherein the card is rectangular in plan view, and the printing layer adjoins the IC in the longitudinal direction of the card.

7. The visible display card according to claim 1, wherein the card is rectangular in plan view, and the printing layer adjoins the IC in the longitudinal direction of the card and the direction perpendicular to the longitudinal direction.

8. A card processing system including a visible display card and a card processing unit for performing a predetermined process to the visible display card;
   the visible display card comprising:
      a printing layer provided on at least one side of the card, the printing layer being printable thereon by being heated; and
      an IC disposed by the side of the printing layer and having an external terminal;
      the height of the printing layer from the surface of the card being greater than that of the external terminal;
   the card processing unit comprising:
      a thermal head movable so as to contact and separate from the printing layer of the card traveled in the unit, and forming images on the printing layer by contacting and heating the printing layer; and
      an IC unit having a terminal for contacting the external terminal of the IC.

9. The card processing system according to claim 8, wherein the thermal head is arranged so that an end thereof overlaps the external terminal of the IC in plan view.

10. The card processing system according to claim 8, wherein the thermal head comprises a head for printing images on the printing layer and a head for erasing images printed on the printing layer.

* * * * *